(12) United States Patent
Kim et al.

(10) Patent No.: US 8,905,749 B2
(45) Date of Patent: Dec. 9, 2014

(54) CASTING BELT FOR PRODUCING TRANSCENDENTAL WIDE WIDTH FILM

(71) Applicant: SK Innovation Co., Ltd., Seoul (KR)

(72) Inventors: Hyuk Jun Kim, Daejeon (KR); Ki Yup Kim, Seoul (KR); Sung Ho Son, Daejeon (KR); Yong Gyun Cho, Daejeon (KR); Chol Ho Lee, Daejeon (KR); Yoo Seock Hwang, Daejeon (KR)

(73) Assignee: SK Innovation Co., Ltd. (KR)

( * ) Notice: Subject to any disclaimer, the term of this patent is extended or adjusted under 35 U.S.C. 154(b) by 0 days.

(21) Appl. No.: 14/183,850

(22) Filed: Feb. 19, 2014

(65) Prior Publication Data

US 2014/0186485 A1    Jul. 3, 2014

Related U.S. Application Data

(63) Continuation-in-part of application No. 13/515,623, filed as application No. PCT/KR2010/008090 on Nov. 16, 2010, now abandoned.

(30) Foreign Application Priority Data

Dec. 14, 2009  (KR) .................. 10-2009-0123684

(51) Int. Cl.
  *B29C 41/28*  (2006.01)
  *B29C 39/14*  (2006.01)
  *B29C 41/38*  (2006.01)
(52) U.S. Cl.
  CPC ............... *B29C 41/28* (2013.01); *B29C 41/38* (2013.01)

USPC .......................................... 425/471; 425/223
(58) Field of Classification Search
  USPC ......................................... 425/223, 224, 471
  See application file for complete search history.

(56) References Cited

U.S. PATENT DOCUMENTS

| 2,569,367 | A | 9/1951 | Bradner et al. |
| 3,728,066 | A | 4/1973 | Stadler et al. |
| 6,908,295 | B2 | 6/2005 | Thielman et al. |
| 7,139,519 | B2 | 11/2006 | Darcy, III et al. |
| 2007/0281112 | A1 | 12/2007 | Shi et al. |
| 2008/0177242 | A1 | 7/2008 | Chang et al. |

FOREIGN PATENT DOCUMENTS

| EP | 0501738 | 9/1992 |
| EP | 1477830 | 11/2004 |
| JP | 60250810 | 12/1985 |
| JP | 2005104148 | 4/2005 |
| KR | 1020090110082 | 10/2009 |

OTHER PUBLICATIONS

International Search Report—PCT/KR2010/008090 dated Aug. 30, 2011.

*Primary Examiner* — James Mackey
(74) *Attorney, Agent, or Firm* — Cantor Colburn LLP

(57) ABSTRACT

Disclosed is a casting belt used for manufacturing an optical film by means of a solvent casting process, in more detail, a casting belt for producing a transcendental wide width film which is used to produce a film in a gel state by casting a dope when manufacturing a film that is used for a polarizer of liquid crystal displays or optical compensation films.

4 Claims, 4 Drawing Sheets

CASTING BELT FOR PRODUCING TRANSCENDENTAL WIDE WIDTH FILM

CROSS REFERENCE TO RELATED APPLICATIONS

This application is a continuation-in-part application of U.S. application Ser. No. 13/515,623 filed Jul. 11, 2012, which is a national entry of International Application No. PCT/KR2010/008090, filed on Nov. 16, 2010, which claims a priority to and benefits of Korean Patent Application No. 10-2009-0123684 filed on Dec. 14, 2009, the contents of which are incorporated herein by reference in their entireties.

TECHNICAL FIELD

The present invention relates to a casting belt used for manufacturing an optical film by means of a solvent casting process, in more detail, a casting belt for producing a transcendental wide width film which is used to produce a film in a gel state by casting a dope when manufacturing a film that is used for a polarizer of liquid crystal displays or optical compensation films.

BACKGROUND ART

Cellulose acylate films have high transparency and mechanical properties, and also have dimensional stability that is little dependent on humidity and temperature. Therefore, they are widely used as supports of optical materials requiring those features. In general, the cellulose acylate films are manufactured by casting a dope made by melting a solvent with polymer onto a continuous support.

The casting method can be largely divided into belt casting and drum casting in accordance with the types of continuous supports. The belt casting is a method that casts a dope on a belt, dries and separates a solvent, and conveys a film to the next process, while the drum casting is a method that casts a dope on a drum, separates it without drying, and conveys a film to the next process.

In general, the belt casting can manufacture a variety of films because it can control dry conditions of films, while the drum casting can be used for mass production, because it can perform high-speed casting. Both of the methods should accurately machine the surfaces of the drum and the belts, which are continuous supports, to implement a clean surface required for liquid crystal displays.

It is required to accurately polish the surfaces of both the belt and drum in order to accurately machine the surface of the continuous supports. The belt is manufactured by grinding and polishing a belt made of stainless steel while the drum is manufactured by plating nickel and hard chrome on a drum made of carbon steel and polishing it.

Although it is not a problem in the drum, referring to FIG. 1, it is required for the belt to forming a joint 11 connecting both ends of the belt to achieve a continuous support. Welding is widely used to form the joint, and TIG welding and laser welding are commonly used. The welding may be performed before polishing, and may be performed after polishing. The welded portion should be polished to prevent a problem in manufacturing a film, because the welded portion may remain on the belt after the welding. However, it is impossible to completely remove the welded portion and it is possible to see the welded portion with naked eyes. Therefore, some products are used with the welded portion cut off, when a polarizer or an optical compensation film is manufactured by using produced cellulose acylate.

Recently, the size of liquid crystal displays gradually increases, and accordingly, the width of polarizers and optical compensation films increases. Therefore, it needs to increase the width of cellulose acylate to come up with the increase in width and to increase yield in manufacturing the polarizers and optical compensation films.

Since a drum having a width of 2030 mm or more can be manufactured by technologies that have been developed at the present time, a wide film can be manufactured, whereas it is known that a belt having a width of maximum 2030 mm can be manufactured. Therefore, two belts can be longitudinally welded to achieve a wide belt having a width over 2030 mm; however, a joint is formed at the center longitudinally between two belts by welding, such that the central joint is imprinted on a manufactured film and the film cannot be used itself.

The dope casted on the belt is separated and manufactured in a film by a tender and a drier. The film contacts in the width direction from casting to separating, such that necessary extension is performed by the tender. The dimensions of the film are not largely changed in the drying process using the drier. In general, a trimming process that cuts off both ends of the film is performed to smoothly convey the film and keep the properties of the entire film, and the trimming process is performed at one to two times after the casting process, the tender process, and the drying process.

Therefore, when a belt having a width of 2030 mm is used, the width of an available film is 2030 mm or less. Considering stability, extension in the tender, and cutting-off of both ends of the film in the substantial casting, the available maximum width is 1800 mm, such that it is difficult to manufacture a film according to the increase in width.

SUMMARY OF THE INVENTION

The present invention provides a casting belt for producing a transcendental wide width film which makes it possible to manufacture a transcendental wide width film without imprinting a welded portion on a film in manufacturing the film.

The present invention provides a casting belt for producing a transcendental wide width film which makes it possible to increase quality of a welded portion by using a jig for transverse welding with laser.

The present invention provides a casting belt where a polymer solvent is casted to form a gel-state film in manufacturing an optical film by means of a solvent casting process, wherein the casting belt 100 includes transverse welded portions 111 formed in the transverse direction of the casting belt 100 to connect adjacent casting belt sections 110 such that the adjacent casting belt sections are longitudinally connected without welded portions longitudinally formed, the thickness $t_w$ of the transverse welded portions is $0.95\ t_b \le t_w \le 1.05\ t_b$ when the thickness of the casting belt sections is $t_b$, and the size of pin holes formed in the transverse welded portions 111 is 20~50 μm and the depth is within 50 μm.

In the present invention, the width $W_w$ of the transverse welded portions 111 maybe within 2 mm, the transverse welded portions 111 may make an angle of 20° with the transverse cross-section of the casting belt 100, and the width of the casting belt 100 maybe 2000 mm or more.

According to the present invention, it is possible to manufacture a wide film having a width of 2000 mm or more without imprinting welded portions, because casting belt sections that are longitudinally adjacent to each other are connected by transverse welded portions, not longitudinal welded portions that connects casting belt sections that are transversely adjacent to each other.

When a transcendental wide width casting belt is manufactured by longitudinal welding using laser, it is difficult to fix belts in welding and it is required to weld a long belt, such that it is difficult to satisfy quality required in manufacturing an optical film. However, a transcendental wide width casting belt is manufactured only by transverse welding, a jig can be used, such that, in the present invention, it is possible to perform transverse welding, with the casting belt sections fixed; therefore, it is possible to improve quality of the transverse welded portions Further, according to the present invention, it is possible to easily manufacture a film having a necessary width while satisfying limited conditions in an in-surface phase difference, an on-surface phase difference, and a thickness of a film, because it is possible to manufacture a wide film without increasing elongation of the film in the extending process of the manufacturing process of an optical film.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, an embodiment of the present invention will be described in detail with reference to the accompanying drawings.

An embodiment of the present invention relates to a casting belt for producing a transcendent wide width film according to the present invention.

Figure 1:
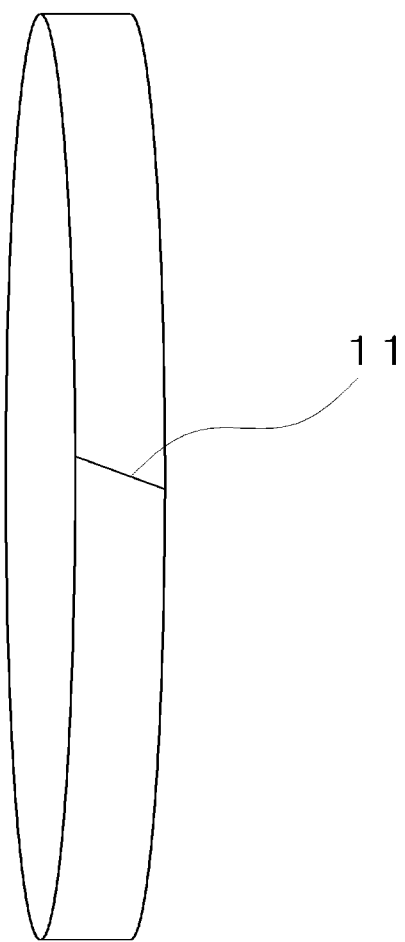
FIG. 1 is a perspective view of a casting belt of the related art.
Figure 2:
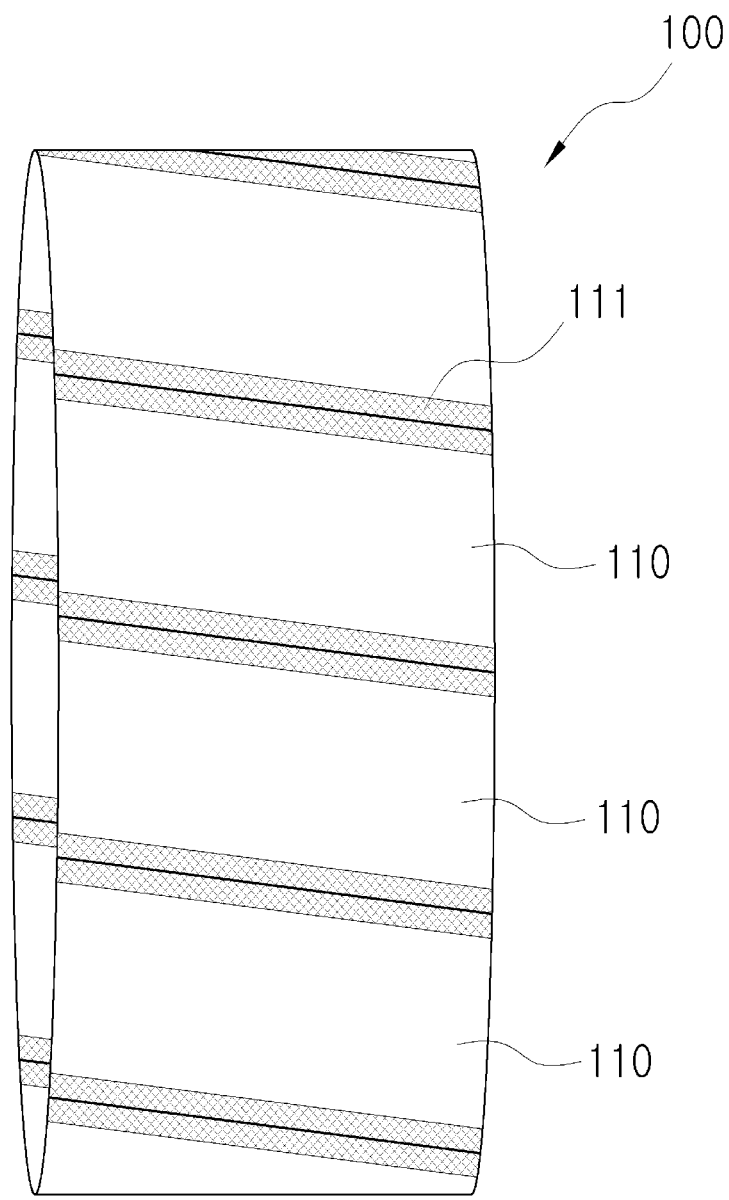
FIG. 2 is a perspective view of an embodiment of the present invention.
Figure 3:
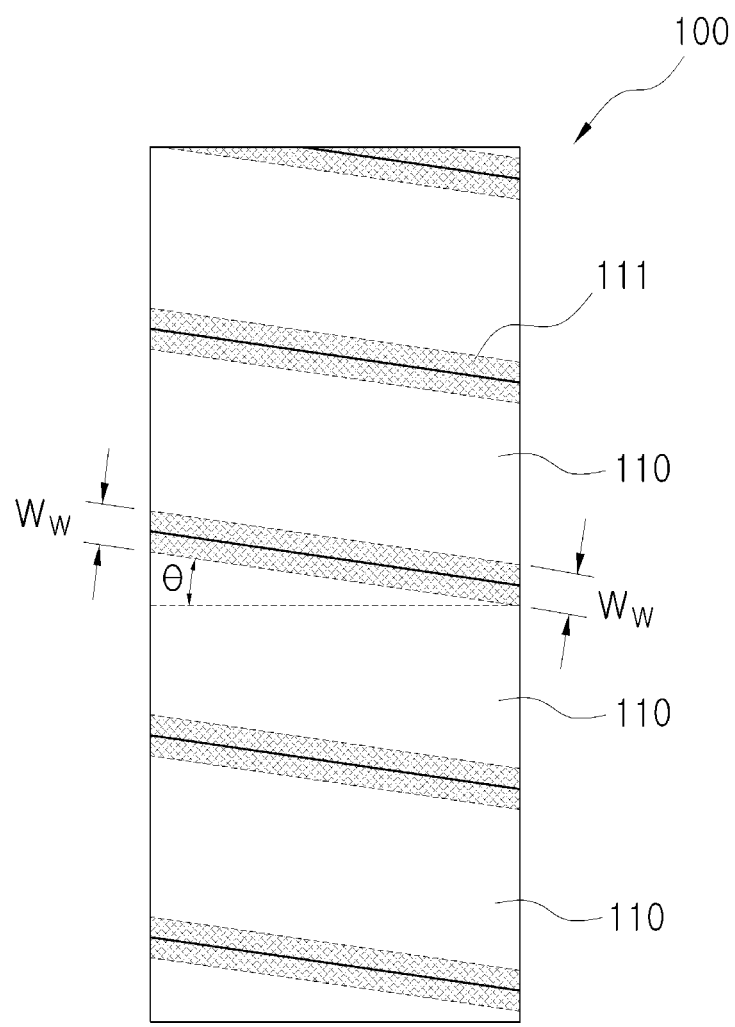
FIG. 3 is a plan view of an embodiment of the present invention.
Figure 4:
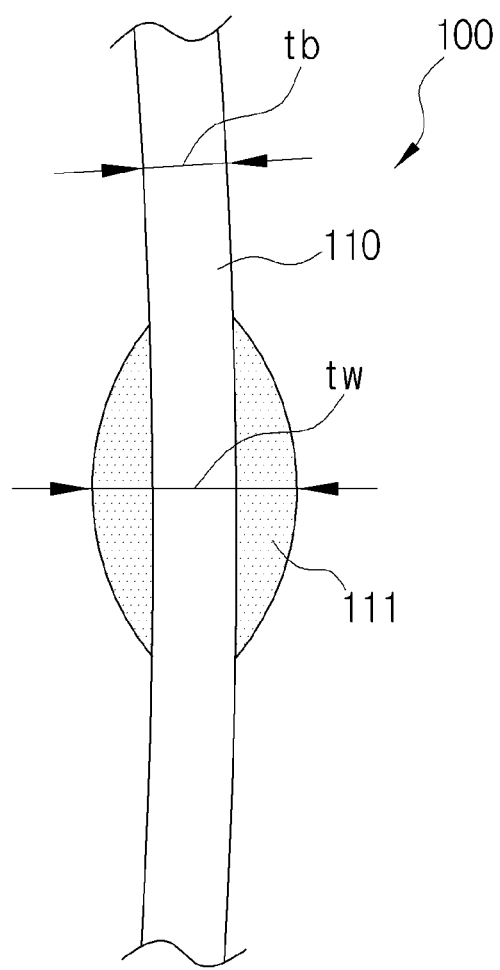
FIG. 4 is a side view of a casting belt of the present invention.

FIG. 2 is a perspective view of an embodiment of the present invention. FIG. 3 is a plan view of an embodiment of the present invention. FIG. 4 is a side view of a casting belt of the present invention.

Manufacturing an optical casing by means of solvent casting performs a casting process that casts a dope containing a polymer solution on a belt to manufacture a film, using the polymer solution, a separating process that separates a gel-state film formed in the casting process, an extending process that extends the separated film with a tender, a drying process that dries the extended film, and a winding process that winds the dried film.

An embodiment of the present invention relates to a belt that is used in a casting process for manufacturing an optical film by means of solvent casting, that is, a casting belt for manufacturing a transcendental wide width where a dope containing a polymer solvent is casted to form a gel-state film.

Referring to FIG. 2, a casting belt 100 for manufacturing a transcendental wide width film is composed of five casting belt sections 110. The sizes and shapes of the casting belt sections 110 may be the same.

Referring to FIG. 2, the casting belt sections 110 adjacent to each other in the longitudinal direction of the casting belt 100 is connected by transverse welded portions 111. That is, the transverse welded portions 111 are joints that connect the adjacent casting belt sections 110 longitudinally arranged, to make a continuous belt from the casting belt sections 110. The transverse welded portions 111 are formed by welding, for example, YAG laser welding or common laser welding.

Referring to FIGS. 3 and 4, when the transverse welded portion is formed by the YAG welding, the width $W_w$ of the transverse welded portion 111 can be within 1 mm, and when it is formed by the common laser welding, the width $W_w$ of the transverse welded portion 111 can be within 2 mm. When the width of the transverse welded portion 111 is large, the welded portion is likely to be imprinted on a film, such that it is preferable that the width $W_w$ of the transverse welded portion 111 is within 2 mm.

Referring to FIGS. 3 and 4, the transverse welded portion 111 is formed at an angle of θ, 20°, from the transverse cross-section of the casting belt 100. This is for preventing the transverse welded portion 111 from breaking by maximally distributing the force applied to the casting belt sections 110 in an operation with tension exerted in the casting belt 110 for manufacturing a transcendental wide width film.

Thought not shown in the drawings, pin holes are formed in the transverse welded portion 111, and the size of the pin hole is 20~50 μm and the depth is within 50 μm. Blowholes are formed in welding, and they are made in the pin holes. It is known that the maximum size of the pine hole which can be seen by naked eyes of common people is 20 μm. Therefore, the size may not case a problem up to 50 μm, but larger sizes have a limit in being used for films for LCDs.

On the other hand, though not shown in the drawings, when the thickness of the casting belt sections 110 is $t_b$, the thickness $t_w$ of the transverse welded portion is $0.95\,t_b \leq t_w \leq 1.05\,t_b$. That is, the difference in thickness of the transverse welded portion 111 and the other portions is within 5%. This is for prevent the welded portion from being imprinted on the film in solvent casting.

Meanwhile, the width of the casting belt 100 is 2000 or more, for example, 2000 mm or 2030 mm, which is the maximum belt width in the related art.

The present invention has the advantage that it is possible to manufacture a transcendental wide width film having a width of 1800 mm or more, without imprinting the transverse welded portions 111 on the film, by reducing the size and depth of the pin holes formed in the transverse welded portions 111 and reducing the difference in thickness of the transverse welded portions 111 and the other portions. That is, when an optical film is manufactured by solvent casting, the surface state of the film is largely influenced by the surface state of the belt, as compared with common extrusion casting; however, according to the present invention, it is possible to achieve a wide film without a welded portion imprinted.

When the transcendental wide width casting belt 100 is manufactured by longitudinal welding using laser, it is impossible to fix the left belt at the transversely left side and the right belt connected to the left belt, at the transversely right side, because a jig cannot be used, such that defects are easily generated in the welded portion due to bad longitudinal welding. The present invention manufactures the casting belt for producing a transcendental wide width film by performing transverse welding that transversely welds the casting belt 100, not longitudinal welding that longitudinally welds the casting belt 100. On the other hand, when the transcendental wide width casting belt 100 is manufactured by transverse welding using laser, a jig can be used, such that, in the present invention, it is possible to perform transverse welding, with the casting belt sections 110 fixed; therefore, it is possible to improve quality of the transverse welded portions 111.

The present invention has the advantage of easily manufacturing a film having a necessary width while satisfying limited conditions in an in-surface phase difference, an on-surface phase difference, and a thickness of a film, because it is possible to manufacture a wide film without increasing elongation of the film in the extending process of the manufacturing process of an optical film.

What is claimed is:

1. A casting belt for producing a transcendental wide width film where a polymer solvent is cast to form a gel-state film in manufacturing an optical film by means of a solvent casting process, wherein the casting belt includes transverse welded portions formed in the transverse direction of the casting belt to connect adjacent casting belt sections such that the adjacent casting belt sections are longitudinally connected without welded portions longitudinally formed, and a thickness $t_w$ of the transverse welded portions is $0.95\ t_b \leq t_w \leq 1.05\ t_b$ when a thickness of the casting belt sections is $t_b$, and a size of pin holes formed in the transverse welded portions is 20~50 μm and a depth of pin holes is within 50 μm.

2. The casting belt for producing a transcendental wide width film according to claim 1, wherein a width $W_w$ extending in a direction transverse to a welding direction of the transverse welded portions is within 2 mm.

3. The casting belt for producing a transcendental wide width film according to claim 2, wherein the transverse welded portions make an angle of 20° with the transverse cross-section of the casting belt.

4. The casting belt for producing a transcendental wide width film according to claim 3, wherein a width extending in a direction transverse to a longitudinal direction of the casting belt is 2000 mm or more.

* * * * *